United States Patent
Obermeier et al.

(10) Patent No.: US 7,963,154 B2
(45) Date of Patent: Jun. 21, 2011

(54) SENSOR UNIT FOR THE MEASURMENT OF A VARIABLE IN A MEDIUM

(75) Inventors: Ernst Obermeier, Kaufbeuren (DE);
Biswajit Mukhopadhyay, Berlin (DE);
Jochen Von Berg, Winterthur (CH);
Ulrich Albicker, Lauchingen (DE);
Marco Gnielka, Winterthur (CH);
Claudio Cavalloni, Regensdorf (CH)

(73) Assignee: Kistler Holding AG, Winterthur (CH)

( * ) Notice: Subject to any disclaimer, the term of this patent is extended or adjusted under 35 U.S.C. 154(b) by 304 days.

(21) Appl. No.: 12/439,273

(22) PCT Filed: Aug. 28, 2007

(86) PCT No.: PCT/CH2007/000421
§ 371 (c)(1),
(2), (4) Date: Mar. 31, 2009

(87) PCT Pub. No.: WO2008/025182
PCT Pub. Date: Mar. 6, 2008

(65) Prior Publication Data
US 2010/0018494 A1    Jan. 28, 2010

(30) Foreign Application Priority Data
Aug. 30, 2006   (CH) ................................. 1391/06

(51) Int. Cl.
*G01M 15/00* (2006.01)
(52) U.S. Cl. ................ 73/114.37; 73/114.16; 73/114.76
(58) Field of Classification Search .............. 73/114.16, 73/114.37, 114.43, 114.57, 114.76
See application file for complete search history.

(56) References Cited

U.S. PATENT DOCUMENTS

| 5,524,491 | A  | * | 6/1996  | Cavalloni ........................ 73/587 |
| 5,973,590 | A  |   | 10/1999 | Kurtz et al. |
| 6,845,664 | B1 |   | 1/2005  | Okojie |
| 7,743,663 | B2 | * | 6/2010  | Von Berg et al. ............... 73/727 |
| 2008/0264173 | A1 | * | 10/2008 | Von Berg et al. ............... 73/727 |

FOREIGN PATENT DOCUMENTS

| DE | 19509188 | 9/1995 |
| DE | 10131697 | 1/2002 |
| DE | 102004013073 | 9/2005 |
| EP | 0251592 | 1/1988 |
| WO | WO9858409 | 12/1998 |

OTHER PUBLICATIONS

English translation of International Preliminary Examination Report on Patentability, issued Mar. 27, 2009.

* cited by examiner

*Primary Examiner* — Eric S McCall
(74) *Attorney, Agent, or Firm* — Dority & Manning, P.A.

(57) ABSTRACT

A sensor unit for measuring a measurement variable in a medium, in particular in an aggressive liquid or gaseous medium, comprises a sensor that is arranged in a sensor capsule and has a sensor region that is arranged on a base body. In order to detect the measurement variable in the sensor region, a measurement opening is provided in the sensor capsule. On a side facing the measurement opening, the sensor region has a measurement surface that is provided with measurement electronics. An electrical supply line is provided on the sensor for the purpose of transmitting a sensor signal that is generated by the measurement electronics. A plated-through hole is provided in the base body. The plated-through hole is used to connect the measurement electronics to the electrical supply line via signals through the base body, on a base side of the sensor that faces away from the measurement opening.

17 Claims, 4 Drawing Sheets

SENSOR UNIT FOR THE MEASURMENT OF A VARIABLE IN A MEDIUM

CROSS-REFERENCE TO RELATED APPLICATIONS

This application claims priority to Swiss Application No. 1391/06 filed Aug. 30, 2006, and International Application Serial No. PCT/CH2007/000421 filed Aug. 28, 2007.

TECHNICAL FIELD

The present invention relates to a sensor unit for measuring a measurement variable, in particular in an aggressive medium, a sensor having a sensor unit according to the present invention, as well as an internal combustion engine, a hydraulic or pneumatic tool and an air conditioning device having a sensor unit or a sensor according to the present invention.

STATE OF THE ART

In the state of the art, a variety of different sensors for the measurement of the most different measurement variables is known. In this context, sensors which detect temperature and pressure data from machines or tools for example, in order to monitor certain operating conditions or to control or regulate these devices, become more and more important. A great problem in this respect is in principle the highly exact detection of the relevant measurement variables in aggressive media, in particular if the sensor in addition to the medium to be measured is also charged with external influences which have nothing to do with the actual measurement. Such influences may be for example aggressive chemical, physical, mechanical or other properties of the medium or the measurement environment or for example also temperature influences which act onto the sensor. A typical example is a piezosensor which has to detect the pressure and/or the temperature in an aggressive medium, for example that of an engine oil in the operating condition of the internal combustion engine.

In this respect there frequently also arises the problem that the sensor is affected by the incorporation per se, i.e. by the contact with the machine since due to the incorporation per se a coupling between machine and sensor is built up whereby for example thermally or mechanically induced tensions are transmitted to the sensor which simulate measurement signals in the sensor due to its piezoelectric or other measurement principles while said measurement signals do not originate from said medium to be measured at all and thus falsify the actual measurement signal in a completely unacceptable manner.

The customers more and more request small sensors which are for example provided with a M5 connecting thread, at the same time allow for highly exact measurements wherein in particular the measurement of the pressure and/or temperature in aggressive gaseous and liquid media is moved more and more into the spotlight. Additionally, it is more and more required that such sensors are also able to work at high temperatures.

Although a variety of standard sensors is well known from the state of the art, no measurement sensor is available up to now which simultaneously meets all of the properties as described above.

Thus, standard sensors are known which are more or less well suitable for the use under severe environmental conditions, i.e. for the use in e.g. chemically, physically or mechanically aggressive environments and for the measurement in such media. Generally, such known sensors comprise a sensor housing equipped with a flush mounted steel diaphragm, onto which the measurement medium acts, whereby the chip which is disposed behind the steel diaphragm and which comprises the measurement electronics, i.e. for example a piezoresistive or piezoelectric measuring element, is protected. The coupling between steel diaphragm and the chip arranged behind the steel diaphragm, i.e. on the inside of the sensor housing of the sensor, is then achieved either via a liquid, for example silicone oil, mercury or another suitable liquid coupling medium or via a mechanical coupling. A structure of the type described is explained for example in EP 0 251 592 or DE 195 09 188 A1.

A significant problem of this solution resides in the fact that the possibility to miniaturize such sensors is limited due to their complicated structure, i.e. ultimately due to their operating principle. Thus, according to the knowledge of the applicant up to now there are no sensors world-wide with a M5 connecting thread, which have such an internal structure and work according to the measurement principle described above.

In addition, due to reasons generally known to the person skilled in the art pressure sensors filled with liquid are not suitable for high temperature applications, in particular because due to thermal expansion effects of the coupling medium the measurement results are more and more falsified with increasing temperature and in the worst case the sensor may even be destroyed because the internal pressure that builds up in the coupling medium due to high ambient temperatures can be too high.

In order to promote the miniaturization of the sensors, in particular of pressure sensors, and to reduce the failure impacts of the packing, i.e. by the structure of the sensor per se and thus also by the coupling medium, many manufacturers favour the so called DCE principle (Direct Chip Exposure Principle). Here, the steel diaphragm and the coupling medium are omitted and the measurement medium directly acts onto the processed front side, i.e. the front side of the chip that is provided with piezoresists, metal conductive paths, metal connecting pads etc., which chip frequently is a chip on semiconductor basis that functions according to the piezoresistive principle and which is mostly made from the materials silicon or SOI (Silicon on Insulator).

However, with contaminated and/or aggressive media this may lead to poor or falsified measurement results, or in the worst case to the destruction of the chip and thus of the sensor. Due to this reason, chip coatings are frequently used with the DCE sensor which themselves have a negative effect on the properties and the entire performance of the sensor or may limit the field of application and/or the temperature range thereof. Chip coatings of this type which in the technical literature are usually also referred to as chip coating, often protect only against certain media or only against certain properties of the medium and may themselves be attacked by other media and/or other properties of the medium, whereby naturally the range of application with respect to various technical applications of such a sensor is significantly reduced.

A further dramatic disadvantage of the DCE sensors mentioned above resides in the fact that the chips, which bear the measurement electronics are contacted for the transmission of the measurement signal to an external evaluation electronics by means of a wire. These wire connections or wire contacts, respectively, to contact the chip are in particular very sensitive to vibration and, therefore a frequent cause of failure in environments where vibration prevails, such as e.g. in internal combustion engines or in turbines. In addition, the miniaturization potential is limited by these wire connections.

With a continued development of the DCE sensor, such as it is provided e.g. by the companies Denso or Toyota (see for example in DE 101 31 697 A1), a chip absolutely bonded on glass is contacted by means of the Flip chip technique so that the sensitive wire bonds, i.e. the wire connections, may be omitted. Flip chip technique is a contacting method well known to the person skilled in the field of sensor engineering wherein the chip is inverted in a manner that its front side provided with the measurement electronics is directed towards the contacting surface whereby the chip is disposed at essentially rigid contacts, pins or pads, which on the one hand electrically contact the chip to the signal transmission and which on the other hand simultaneously support and stabilize the chip in a mechanical manner (see for example WO 98 58409).

That has the compelling consequence with regard to construction that the processed upper side of the chip has to be arranged on a side opposite to the inlet port for the medium to be measured since the pins which have to electrically contact the processed chip surface in addition to their pure mechanical supporting function, have to be led out from the sensor housing on the opposite side of the inlet port.

Thus, by omitting the fragile wire bonds a further miniaturization is possible. However, the disadvantage of this construction is that the medium further affects the processed chip front side and therefore the chip is not protected against aggressive media or has to be protected by an appropriate coating whereby the latter is associated with the disadvantages already described in detail above.

In developments of NASA or the companies Kulite and Endevco the inversed chip is no longer absolutely bonded on glass, but sealed on the chip front side in such a manner against a feedthrough or another carrier that the measurement medium can act only onto the chip back side. Therefore, the measurement medium can act onto the back side of the chip which is unprocessed and therefore insensitive against contamination and aggressive media. Thereby, the medium separation between processed chip front side and not processed chip back side is usually carried out by means of a glass solder. Such constructions are for example described in U.S. Pat. No. 6,845,664 B1 or U.S. Pat. No. 5,973,590 A.

The disadvantages of this construction are the very difficult manufacture, a manufacture in the wafer size is e.g. not possible, and the enormous high requirements regarding the chip seal, that means regarding the medium separation, which is usually achieved via a support chip between sensor chip and feedthrough, and regarding the long term stability of the sensor in total.

A slightly similar approach is also followed by a development of Kistler. Also in this case, the measurement medium no longer acts onto the processed chip front side but onto the unprocessed chip back side. The chip contact is no longer effected by means of wire bonding but also over a Flip chip connection as described above, whereby the chip, as already mentioned, is not only contacted electrically but simultaneously fixed mechanically. The seal to the chip front side, i.e. the medium separation, is effected for example over a robust hole diaphragm which is connected over a dense and at the same time flexible or soft adhesive bond (which may be performed for example by means of RTV) with the back side of the chip or its glass body, respectively. Also in this case, however, the chip front side must be arranged in the sensor housing as described above and the construction is correspondingly limited with respect to the miniaturization.

Pressure measuring elements having discrete electrical components which are connected by means of through connections are known from the DE 10 2004 013 073. Here, a pressure measuring diaphragm is introduced into a substrate made of ceramics, glass or plastics. Additionally, at least onto the surface opposite of the diaphragm, electrical components which are connected by means of conductor paths are applied by thin and/or thick layer techniques. For sensory applications, such constructions have the following known disadvantages: They do not have miniaturization potential, a deep sensitivity as well as no possibility of batch fabrication.

BRIEF OBJECTS AND SUMMARY OF THE INVENTION

Thus, the object of the invention is to provide a novel sensor unit, which no longer exhibits the disadvantages known from the state of the art, permits extensive miniaturization and which may be employed in particular in aggressive and/or contaminated media, is largely insensitive against vibrations, and above all may also be employed in high ambient temperatures, wherein the measurement results are not affected by temperature influences.

The subject-matters of the invention solving these objects are characterized by the features of the independent claim 1. The dependent claims relate to particularly favourable embodiments of the invention.

Thus, the invention relates to a sensor unit for measuring a measurement variable in a medium, in particular in an aggressive liquid or gaseous medium, comprising a sensor disposed in a sensor capsule, having a sensor region which is arranged on a base body, wherein in order to detect the measurement variable in the sensor region, a measurement opening is provided in the sensor capsule. On a side facing the measurement opening, the sensor region has a measurement surface which is provided with measurement electronics, wherein an electrical supply line is provided at the sensor for the purpose of transmitting a sensor signal which is generated by the measurement electronics. The base body and measurement electronics consist of semiconductor materials. According to the invention, plated-through holes are provided in the base body which are used to connect the measurement electronics to the electrical supply line via signals through the base body on a base side of the sensor which faces away from the measurement opening. The side of the base body onto which the contacts are mounted has no measurement electronics.

In this case the sensor is arranged at the base side on the sensor support in such a sealing manner that the reference surface of the sensor region is isolated from the measurement medium and the measurement medium only acts on the measurement surface.

Since according to the present invention the sensor unit is provided with a plated-through hole by means of which the measurement electronics is connected with the electrical supply line via signals through the base body on the base side of the sensor which faces away from the measurement opening, the wire contacts or wire bondings, respectively, known from the state of the art which are fragile and susceptible to vibration, may be omitted.

That means that in the present invention the chip is no longer charged with the measurement medium on the back side, but on the front side as with the known DCE principle. However, the novelty of the present invention resides in the fact that the contact, e.g. of the piezoresists is no longer effected over metal pads, metal conductive paths and wire connections which are disposed on the front side, but over plated-through holes, preferably in an absolutely bonded glass or silicon plate, on the back side.

Due to this, the metal structures which are sensitive against aggressive media can be completely omitted from the measurement electronics and only the inert silicon structures interact with the medium to be measured.

Thus, the construction of the sensor unit according to the present invention is significantly more simple, its susceptibility to vibrations and accelerations is almost reduced to zero and no elaborate protection of the processed chip front side by sealing measures, steel diaphragms etc. is necessary, since the sensor region, i.e. the chip front side, where the detection of the measurement variable is made is directly exposed to the medium to be measured. Since in addition no coupling medium is required, the sensor according to the present invention may also be employed in applications of high temperatures without any problems.

In an embodiment particularly important for the practice, the measurement electronics is provided with a cover layer, in particular with a thin passivation layer made of silicon oxide and/or silicon nitride for the purpose of protection against the medium. According to the present invention only silicon structures which are resistant to the measurement medium are exposed to aggressive media so that external protection and insulation coatings (chip coatings), such as e.g. a protective coating with the polymer Parylen, may be omitted. Solely, the above mentioned passivation layer made of silicon oxide and/or silicon nitride which is known in microelectronics, may be favourably deposited on the chip front side.

Due to the fact that the contacting is effected on the back side of the chip, the whole surface of the front side may be coated with the cover layer mentioned above. There are no recesses required for the contacting.

The chip according to the present invention may be manufactured batch wise, which immensely reduces the costs. Required for this fabrication are the materials used, in particular semiconductor materials for the base body and the measurement electronics.

In addition, the structure according to the present invention of the sensor with the electrical supply line on the back side permits a miniaturization since no supply lines have to be directed over the edge of the sensor from the front side to the electrical supply lines in the support plate which would occupy space.

Depending on the requirements, a reference means may be provided so that a reference surface opposite to the measurement surface may be charged with a reference measurement variable. Such a variation may be for example favourably employed if the variable to be measured is a relative variable which has to be regarded with respect to a reference measurement variable. A typical example is the measurement of a relative pressure or a pressure difference wherein the absolute amount of the pressure, which prevails for example in the aggressive medium to be measured is not important. In such a case the reference means may be for example a supply, over which the reference surface is charged with a reference medium, e.g. with a gas or a liquid, which is under a predetermined pressure. Thus, the pressure difference between the aggressive medium and the pressure, i.e. the reference measurement variable of the reference medium can be immediately determined.

In contrast to most embodiments known from the state of the art the construction according to the present invention is particularly advantageous in that the reference means may also be an aggressive medium since the reference surface (chip back side) consists of chemically inert silicon as well.

It is preferable but not necessary that at the measurement opening of the sensor unit is provided a hole diaphragm. This may serve in particular to prevent the penetration of coarse dirt particles into the sensor capsule and/or to protect the sensor region of the sensor against detrimental effects, e.g. against the detrimental abrasive effects by coarse protection particles which are carried by the medium to be measured.

Preferably, the sensor is arranged on a sensor support, in particular arranged on a glass or silicon wafer, which carries the sensor and on which the sensor may be mechanically fixed.

For this purpose, for medium separation between the measurement surface and the reference surface the sensor may be connected in a predeterminable range at the base side with said sensor support in a sealing manner, in particular by means of an anodic bond process.

As a bond process above all anodic bonding is employed if the sensor support consists of glass. Another technique of the prior art is Silicon Fusion Bonding (SFB) if the sensor support consists of silicon.

As understood by the persons skilled in the art an anodic bond process is a certain type of fixed connection of two components. If for example one of the bodies is a glass body, such as e.g. a sensor support designed as a glass wafer then a silicon base body may be connected in a predeterminable region by anodic bonding with the glass wafer in a sealing manner. The glass wafer, i.e. the sensor support is for example, but naturally not necessarily, a Pyrex glass, which may comprise a composition of approx. 80% $SiO_2$, 14% $B_2O_3$, 4% $Na_2O$ and 1% $Al_2O_3$. The use of such Pyrex glasses has for example the advantage that its expansion coefficient with approx. $3.3 \times 10^{-6}/K$ is approximately equal to the thermal expansion coefficient of silicon, which is about $2.5 \times 10^{-6}/K$. By this choice of the materials an uncoupling means is provided automatically so that the sensor region of the sensor may be thermally uncoupled of its environment in such a manner that thermal variations, such as temperature variations, can not negatively affect the measurement result.

It is understood that in the scope of this application the term uncoupling means is meant to also include other means or measures, which are suitable to uncouple the sensor in such a manner from thermal and/or mechanical changes that a measurement result is not affected e.g. by thermal variations, in particular by temperature variations.

A typical anodic bond process is effected in a known manner as follows: the silicon base bodies and the glass wafer are brought into close contact and are heated to a temperature between 300° C. and 500° C., preferably to e.g. 450° C. Then a negative DC voltage, e.g. between 700V and 1000V, is applied to the glass wafer with grounded SI wafer. By the high electrical field and the high temperature the $Na^+$ ions move away from the glass wafer-silicon interface, in the specific example away from the Pyrex-silicon interface and leave unsaturated oxygen bonds in the glass. Thus, the silicon atoms form fixed chemical SiO bridges, which result in the connection.

Thus, for the medium separation between chip front side and chip back side the seal may be favourably manufactured by an anodic bond process of the silicon base body with the sensor support which is designed as a glass wafer. For this purpose said anodic bond process may be performed routinely in the wafer size. With this construction, in particular an extensive miniaturization is possible, which in the case of a front-flush incorporation corresponds to a minimum dead volume.

In particular, the sensor and thus the sensor unit itself is a high temperature sensor, i.e. for example with a chip made in SOI technique.

SOI is well known to the skilled person as an abbreviation for Silicon on Insulator. The SOI technique is preferably applied in the high temperature range. The typical structure of a layer sequence in SOI technique consists of a substrate made of silicon or a silicon compound on to which a thin, preferably dielectrically insulating layer, which may for example be approx. 0.5 μm thick, is applied, which layer in the field is often also referred to as a BOX layer, because it forms a dielectrical insulating layer between the substrate and a second silicon layer (SOL), which is applied onto the layer referred to as BOX layer and which also may have e.g. a thickness of approximately 0.5 μm. In this regard, the silicon layer applied to the BOX layer comprises e.g. measurement electronics, i.e. piezoresistive and/or piezoelectric elements or silicon conductor paths, which are essentially electrically insulated by the BOX layer from the silicon substrate. This is one of the important reasons why the SOI technique has been found to be particularly favourable in high temperature applications.

It should be understood that it is not necessary to use SOI technique, but other materials such as silicon, quartz, germanium or other suitable materials can be used. In this case the BOX layer naturally could be completely omitted.

As already mentioned, an uncoupling means may be provided for the uncoupling of disturbing thermal and/or mechanical effects by which the sensor may be uncoupled from thermally and/or mechanically induced changes and in particular from the sensor capsule.

Because an uncoupling means is provided by which the sensor may be uncoupled from thermally and/or mechanically induced changes of the sensor capsule, the sensor detects as a measurement variable essentially only the properties of the medium which immediately acts on the sensor region of the sensor. Consequently, disturbing influences which may be coupled by the inevitable coupling of the sensor with the sensor housing of the known sensor units, can be practically completely suppressed by the specific embodiment of the present invention. Thereby, the uncoupling means can comprise for example elastic media so that changes of the sensor housing, such as for example tensions or length variations due to thermal or mechanical influences, thermal extensions due to temperature variations or mechanical stresses, which are for example induced by the incorporation of the sensor into a device, are not transmitted onto the sensor itself so that the measurement electronics is not charged with disturbing environmental influences. Accordingly, the measurement accuracy and measurement sensitivity of the sensor are remarkably improved in comparison to the state of the art. That is particularly advantageous in those cases where the measurement electronics comprises for example piezoelectric or piezoresistive sensors for the measurement of pressure, force or acceleration. If the sensor is for example a pressure or temperature sensor on piezoelectric or piezoresistive basis for the measurement of a pressure or a temperature in a medium, then mechanical tensions of the sensor housing transmitted to the sensor can result in a falsification of the measurement signal and the generation of a sensor signal by the sensor that does not correspond to the actual pressure and/or to the temperature of the medium.

In particular, the uncoupling means may be formed between the base body and the sensor support and/or between the sensor support and a support plate. In particular, as previously mentioned, the uncoupling means may for example be generated by the fact that two materials which are in direct contact with each another have thermal coefficients of expansion which are identical or have a similar value.

In addition the uncoupling means may be favourably provided in the region of the electrical supply line so that no negative thermal and/or mechanical influences are coupled over the electrical contact into the sensor.

In particular, the uncoupling means may be generated by matching the thermal expansion coefficients between the base body and/or the sensor support and/or a connection means and/or the sensor capsule and/or the support plate.

In particular, the support plate can be made of a material having a thermal expansion coefficient which is similar to that of silicon and/or glass so that the thermally induced tensions to be uncoupled remain small from the beginning. This may be for example a ceramic or a particular expansion alloy.

The uncoupling means can be designed naturally simultaneously or alternatively in such a manner that the sensor may be uncoupled also from direct thermal influences by the sensor capsule. This is particularly advantageous if the measurement electronics comprises a temperature sensor for the measurement of a temperature of the medium. In this case it is particularly important that a heat or temperature transmission, respectively between sensor and sensor capsule is prevented so that the sensor actually detects the correct temperature of the medium and not a temperature which is falsified by thermal influences of the sensor capsule.

In this respect, it is naturally also possible to provide the uncoupling means at a peripheral surface of the sensor which is directed radially outwards and also functions as a seal such as described above.

Glass will usually uncouple mechanical distortions only in a very insufficient manner. However, if there is for example only need for a very reliable measurement of the temperature of the medium which is not influenced by mechanical distortions in the sensor due to the measurement principle, the material glass or other materials which are poorly heat conductive may nevertheless be advantageously used as an uncoupling means.

In practice, the sensor unit will frequently comprise mounting means, for example an installation housing with a thread screw connection, in particular with a M5 thread, or with a quick-locking mechanism, for example with a bayonet fixing so that the sensor unit can be incorporated into a device in a simple and reliable manner for the measurement of a medium. In a particularly preferred embodiment the mounting means itself is designed as an uncoupling means so that the sensor capsule may be uncoupled from thermally and/or mechanically induced changes of the installation environment.

As already mentioned, a sensor unit according to the present invention comprises a sensor which is a pressure sensor and/or temperature sensor, in particular a piezoresistive sensor and/or a piezoelectric sensor, for example a piezoelectric temperature sensor.

For the mechanical fixation of the sensor the electrical supply line is particularly advantageously designed as an essentially inflexible pin, or there is provided an essentially inflexible feedthrough for the line which in this case may be for example a flexible electrical supply line whereby the feedthrough then can fix the sensor. The inflexible pin or the inflexible feedthrough may be can uncoupled from thermally and/or mechanically induced changes of the sensor capsule via an uncoupling means which may be for example a more or less elastic plastic or for example a resin or a resinous substance.

The person skilled in the art understands that all embodiments for particular applications which have been discussed in this application may also be combined in a suitable manner, and that the embodiments presented have been given in a representative manner for other embodiments of the invention which are not described in detail herein.

The invention further relates to a sensor with a sensor unit, in particular for the measurement of a gas pressure and/or a temperature in an engine inlet of an internal combustion engine and/or in an engine discharge opening and/or in a combustion chamber and/or in a motor housing and/or in an exhaust system, and/or for the measurement of a pressure and/or a temperature in a turbine, in particular in a gas turbine, or for the measurement of a pressure and/or a temperature of an engine oil, a brake fluid, a hydraulic oil, a transmission oil, a fuel, in particular diesel or gasoline, a refrigerant, or a cooling fluid, in particular of water.

Furthermore, the invention relates to an internal combustion engine, a hydraulic or pneumatic tool or an air conditioning device having a sensor unit and/or a sensor, as described in detail above.

BRIEF DESCRIPTION OF THE DRAWINGS

In the following, the invention is explained in more detail with respect to the drawing. In the following schematic representation.

The Figures are exemplarily shown for a sensor made from SOI technique. Of course the sensor can be fabricated also from silicon or another suitable material instead of SOI.

DETAILED DESCRIPTION OF EXEMPLARY EMBODIMENTS

Figure 1:
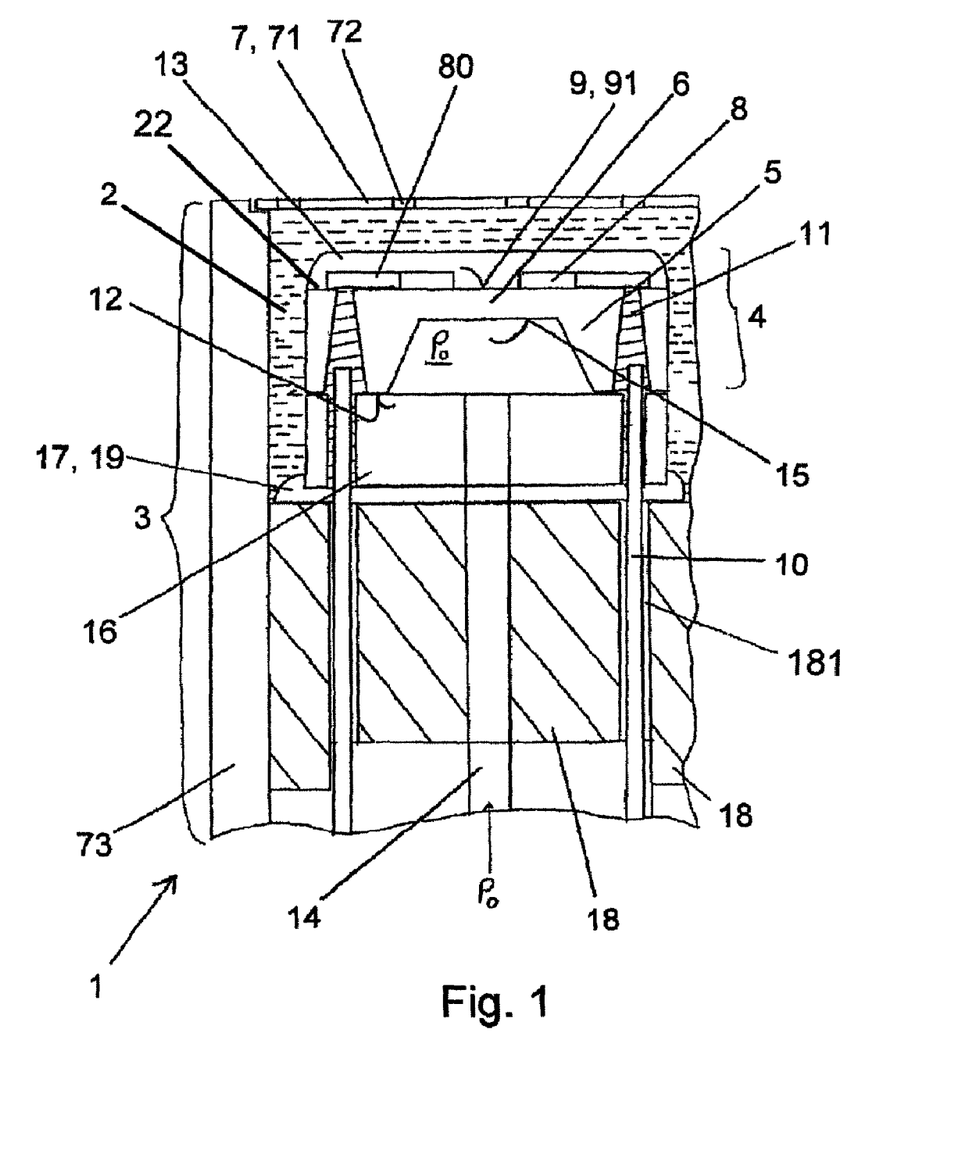
FIG. 1 is a sensor unit according to the present invention with a passivation layer partly in section.

FIG. 1 shows in a schematic representation an embodiment of a sensor unit according to the present invention, partly in section, which in the following as a whole is designated with the reference numeral 1.

The sensor unit 1 which is particularly suitable for the measurement of a measurement variable in an aggressive medium 2 comprises a sensor capsule 3 in which a sensor 4 which in the example illustrated is made from SOI is arranged for the detection of a measurement variable in the aggressive medium 2. The sensor unit 1 may be used for example for the measurement of a pressure and/or temperature of the engine oil in an internal combustion engine or of a pressure and/or temperature of the gas in a turbine.

In the present case of FIG. 1 there is shown a simple pressure sensor for the measurement of the oil pressure in an internal combustion engine. The sensor 4 comprises a sensor support 16 which in the present case is a sensor support 16 made of glass, i.e. a glass wafer, which is connected with the base body 5 which in the embodiment in FIG. 1 is made of silicon by anodic bonding. The base body 5 exhibits a sensor range 6 sensitive for the measurement variable onto which the medium 2 acts which enters through the measurement opening 7 into the sensor unit 1. In the example illustrated herein the internal region of the sensor unit 1 at the measuring opening 7 is protected by a hole diaphragm 71, and the aggressive medium 2, in this case hot oil 2 enters via the openings 72 of the hole diaphragm 71 into the interior of the sensor unit 1.

On one side 91 which is facing the measuring opening 7, there is provided a measurement electronics 8 insulated by the box layer 22 from the base body 5 on a measurement surface 9 which is connected for the transmission of a sensor signal generated by the measurement electronics 8 to an evaluation unit (not shown in FIG. 1) by means of an electrical supply line 10. Base body and measurement electronics consist of semiconductor materials. The measurement electronics 8 may consist for example of piezoresistive or piezoelectric elements, strain gauges or also from other sensory components and is connected for the transmission of the electrical measurement signals over connection bridges 80 to a plated-through hole 11, the function of which will be described in more detail further below.

In this embodiment, the measurement surface 9 with the measurement electronics 8 and connection bridges 80 is provided against the actions of the aggressive medium 2 with a cover layer 13 which in the present case is a passivation layer 13, constructed for example from silicon oxide and/or silicon nitride.

The electrical supply line 10 is designed in the form of an essentially inflexible pin 10 which may be for example a more or less rigid pin 10 made of steel, copper or gold or another suitable material.

Since the base body 5 is absolutely bonded to sensor support 16, the pin 10 of the electrical supply line 10 does not have a substantial mechanical support function and may be embodied in another embodiment of a sensor unit 1 according to the present invention also as a more or less flexible wire 10 which is for example guided in a glass insulation 181 and in the plated-through hole 11 and thus is also safely protected against vibration influences.

In the example illustrated in FIG. 1 the electrical supply line is embodied as a more or less rigid metallic pin 10 which is guided in the region of the support plate 18 made of a steel in the glass insulation 181 so that the pin 10 is electrically insulated against the support plate 18. The embodiment of the electrical supply line 10 as a more or less rigid metallic pin 10 which is connected with the plated-through hole 11 on all sides, makes the sensor unit 1 particularly insensitive against vibrations and acceleration forces such as they inevitably arise in an internal combustion engine or a turbine in the operating condition. The pins are preferably strong enough to be used for the attachment of the base body 5.

Depending on the requirement the support plate 18 may be manufactured from a another suitable metal as well apart from the steel mentioned above, or from a metal alloy, or even from another, not electrically conductive material such as for example a ceramic so that the glass insulation 181 can also be omitted.

It should be understood that in quite special cases the more or less rigid pin 10 may contribute also to the mechanical stabilization of the assembly.

Now it is substantial for the present invention that in the base body 5, as already mentioned, the plated-through hole 11 is provided by means of which the measurement electronics 8 are connected by signals through the base body 5 with the electrical supply line 10 and thus with the metallic pin 10 on the base side 12 facing away from the measuring opening 7 and forming the bottom side of the base body 5 as can be seen from the figure. This bottom side of the base body 5 onto which the contact 10 is mounted does not exhibit any measurement electronics 8. The plated-through hole 11 preferably comprises a suitable electrically conductive material such as e.g. a specific solder or a glass metal paste. In order to achieve an electrical insulation of the plated-through hole 11 from the base body 5 there may be provided between the plated-through hole 11 and the base body 5 at the base body 5 in the region of the plated-through hole 11 an insulating layer 20 which is not represented in FIG. 1, for example an oxidic insulating layer, onto which additionally a metallization 21 which is also not shown in FIG. 1, preferably a high temperature metallization, which also withstands high temperatures, i.e. one that particularly is not oxidized and enables a stable and constant ohmic contact, may be applied onto a side facing the plated-through hole 11.

The electrical contact between the metallization 21 and the connection and contact area 80 may be ensured by selective removal of the insulating layer 20 and the box layer 22 in the region of the contact surface between plated-through hole 11 and the connection and contact area 80 wherein said removal must be accomplished prior to the metallization.

This structure is explained in more detail in the Figures which will be described in more detail.

In order to uncouple the sensor 4 from thermally and/or mechanically induced changes, in particular by the sensor capsule 3, various measures are provided as uncoupling means 17 in the example of FIG. 1. On the one hand the sensor support 16 is attached on the support plate 18 with a bonding means 19, e.g. with a suitable adhesive or resin or another bonding means 19 which due to its specific suitable mechanical and/or thermal properties at the same time acts as a thermal and/or mechanical uncoupling means 17 so that e.g. distortions in the material which may occur due to temperature changes and/or due to mechanical tensions which may occur for example due to the incorporation by means of the mounting means 73 of the sensor unit 1 into a machine, are not coupled into the sensor 4.

As a second measure, which acts as uncoupling means 17, the sensor support 16 is made of a glass or silicon as already described above, e.g. of Pyrex glass, which exhibits a thermal expansion coefficient the value which is equal to or very similar to that of silicon from which the base body 5 is constructed so that in the case of temperature changes mechanical stresses between sensor support 16 and base body 5 can be avoided as much as possible.

Moreover the support plate can be made from a material which possesses an expansion coefficient very similar to the behaviour of glass and/or silicon.

The embodiment represented in FIG. 1 of a sensor unit 1 according to the present invention moreover additionally exhibits a reference means 14 which in the present case is designed as an entrance channel 14 through which the reference surface 15 opposite to the measurement surface 9 may be subjected to a reference measurement variable $P_0$. In the example of FIG. 1 which shows a pressure sensor, the bottom side of the sensor 4 is charged with a fluid e.g. a gas or a liquid, under a predeterminable pressure through the entrance channel 14 so that the sensor unit 1 of FIG. 1 is particularly well suited for the measurement of differential pressures. It is of a particular advantage that not only the measurement medium 2, but also the reference means 14 in this embodiment may be of aggressive nature. It is understood that in another embodiment the reference means 14 may also be omitted.

Figure 2:
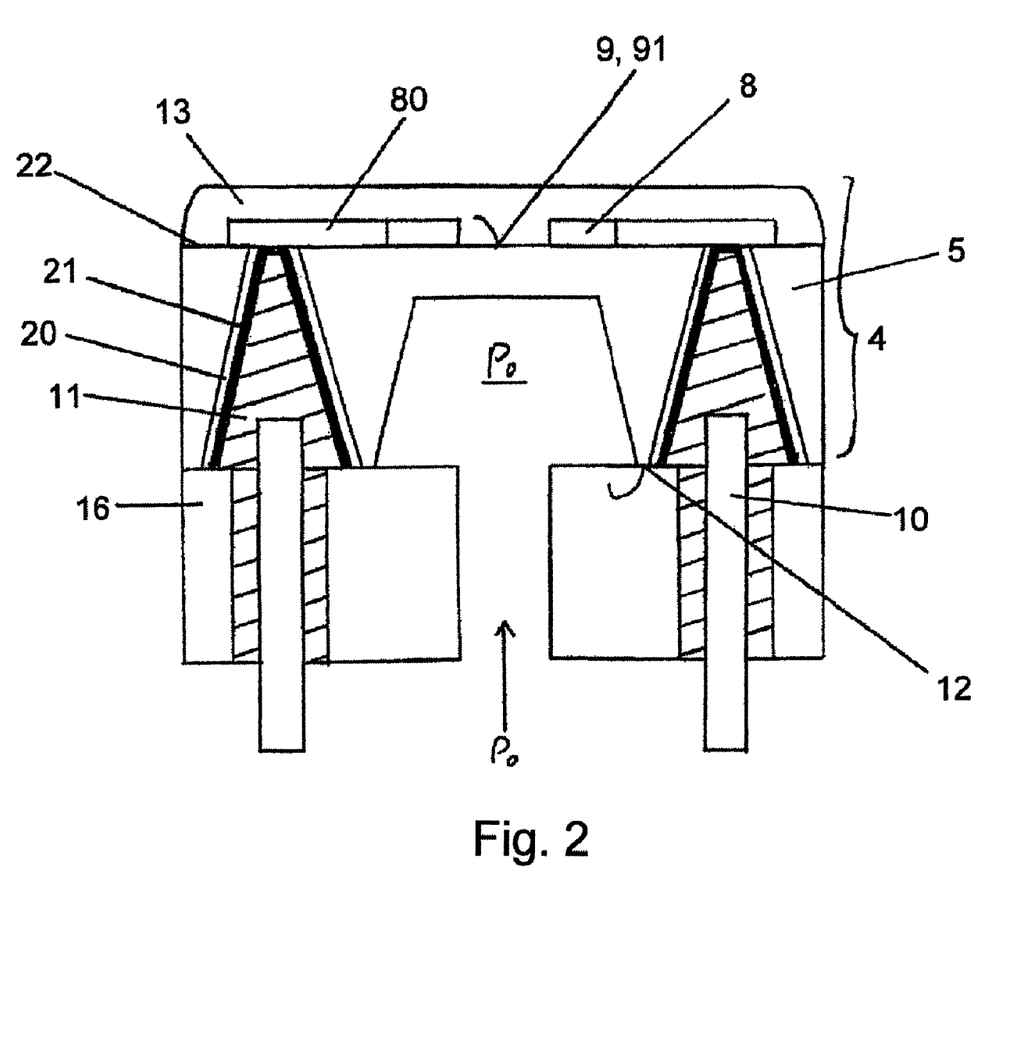
FIG. 2 is an embodiment of a sensor of a sensor unit according to the present invention.

In FIG. 2 there is schematically shown an embodiment of a sensor 4 of a sensor unit according to the present invention. FIG. 2 shows in particular the sensor 4 of FIG. 1 which has already been described above in a more detailed view and the reference numerals of FIG. 2, as well as those of FIGS. 3 and 4 still to be described further below in each case relate to the same technical features as in FIG. 1. That is, the same reference numerals throughout designate features which possess the same technical function but which may be designed differently in the respective case while naturally the substantial technical function is maintained.

As already mentioned several times above, it is essential for the present invention that in the base body 5, as illustrated in detail in FIG. 2, there is provided the plated-through hole 11, through which the measurement electronics 8 is connected by signals through the base body 5 and the box layer 22 with the electrical supply line 10, i.e. with the metallic pin 10, on base side 12 facing away from the measuring opening 7 and forming the bottom side of the base member 5 as illustrated in the figure. The plated-through hole 11 preferably comprises a suitable electrically conductive material, in particular a solder or a glass metal paste.

In order to achieve an electrical insulation of the plated-through hole 11 from the base body 5 there is provided between the plated-through hole 11 and the base body 5 at the base body 5 in the region of the plated-through hole 11 an insulating layer 20, for example an oxidic insulating layer 20, onto which additionally a metallization 21 which in the example of FIG. 2 is a high temperature metallization 21, which is also resistant to high temperatures, i.e. that particularly does not oxidize and enables a stable and constant ohmic contact, is applied onto the side facing the plated-through hole 11 after the selective removal of the insulation layer 20 and the box layer 22 in the region of the contacting surface between plated-through hole 11 and connection and contact area 80. That is, the electrical connection between plated-through hole 11 and measurement electronics 8 or between plated-through hole 11 and connection bridge 80, respectively, is essentially formed via the metallization 21. Thus it is clear that the metallization is of immense importance for the signal transmission from the measurement electronics 8 via the plated-through hole 11 and the pin 10 to the outside to an appropriate evaluation unit.

The measurement electronics 8 and the connection bridge which may be designed for example as a connection and contact area 80, is arranged for electrical insulation against the base body 5 on a box layer 22, which is essentially simply an insulating layer 22 which can be for example 0.5 μm thick and is arranged on the top side of the base body 5, between base body 5 and measurement electronics 8, as well as connection bridge 80 or connection and contact area 80 and/or the cover layer 13.

Figure 3:
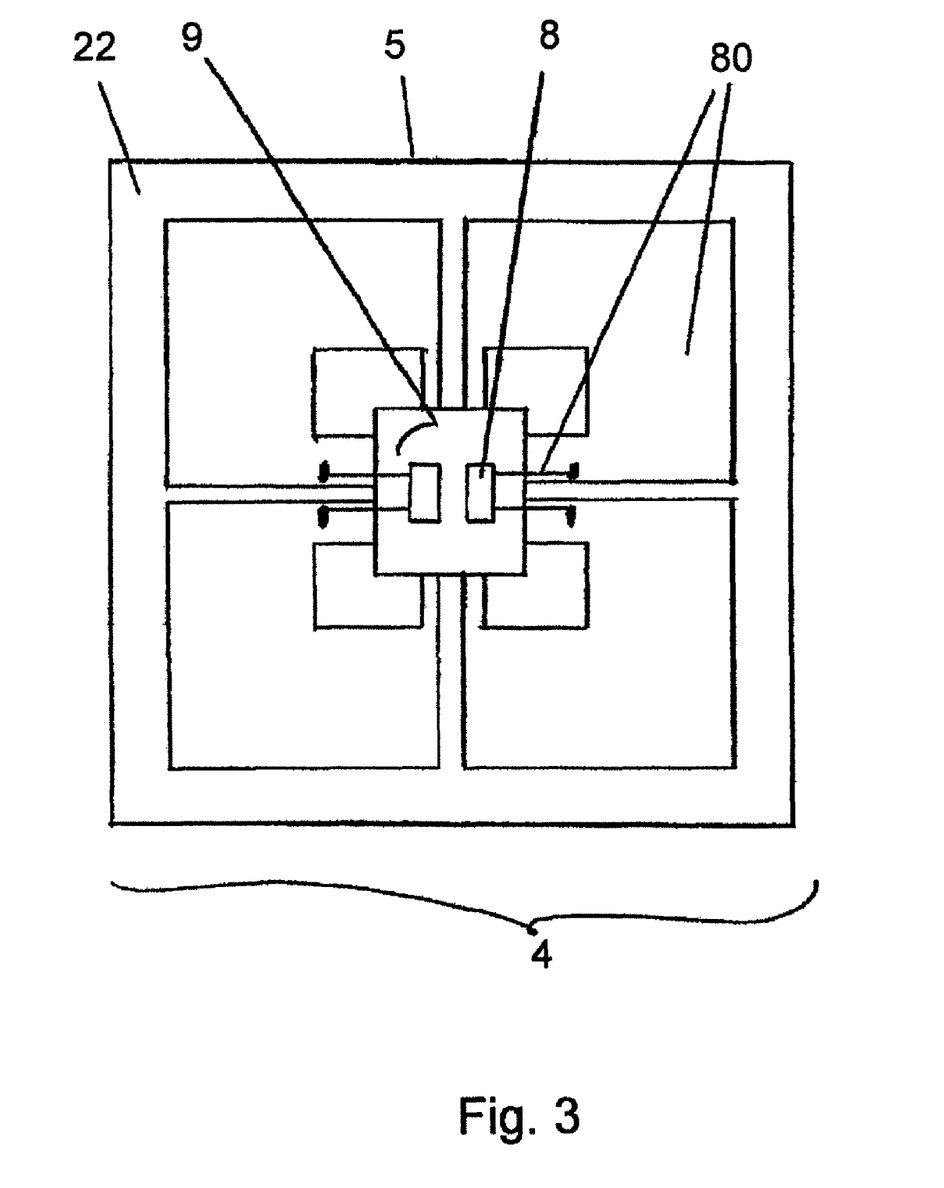
FIG. 3 is a top view in accordance with FIG. 2 of a sensor surface with measurement electronics.

In FIG. 3, a top view in accordance with FIG. 2 of a sensor surface of a sensor 4 with measurement electronics 8 is shown.

As can be seen from the figure, in the centre of the base body 5 or the sensor 4, respectively, there is the measurement surface 9 onto which in the operating condition of the sensor unit 1 the medium 2 acts e.g. by pressurization. On the base body 5 of the sensor 4 there is provided for the insulation of the measurement electronics 8 and the connection bridge 80 which in the example of FIG. 3 is embodied partly in the form of a conductor path and partly in the form of a surface the insulating box layer 22 against the silicon base body 5. Thus, the box layer 22 forms a thin insulating layer 22 between measurement electronics 8 and connection bridge 80 on the one hand and the silicon base body 5 on the other hand. Thus, the connection bridge 80 is preferably designed as a highly doped SOL contact area (P++doped).

Figure 4:
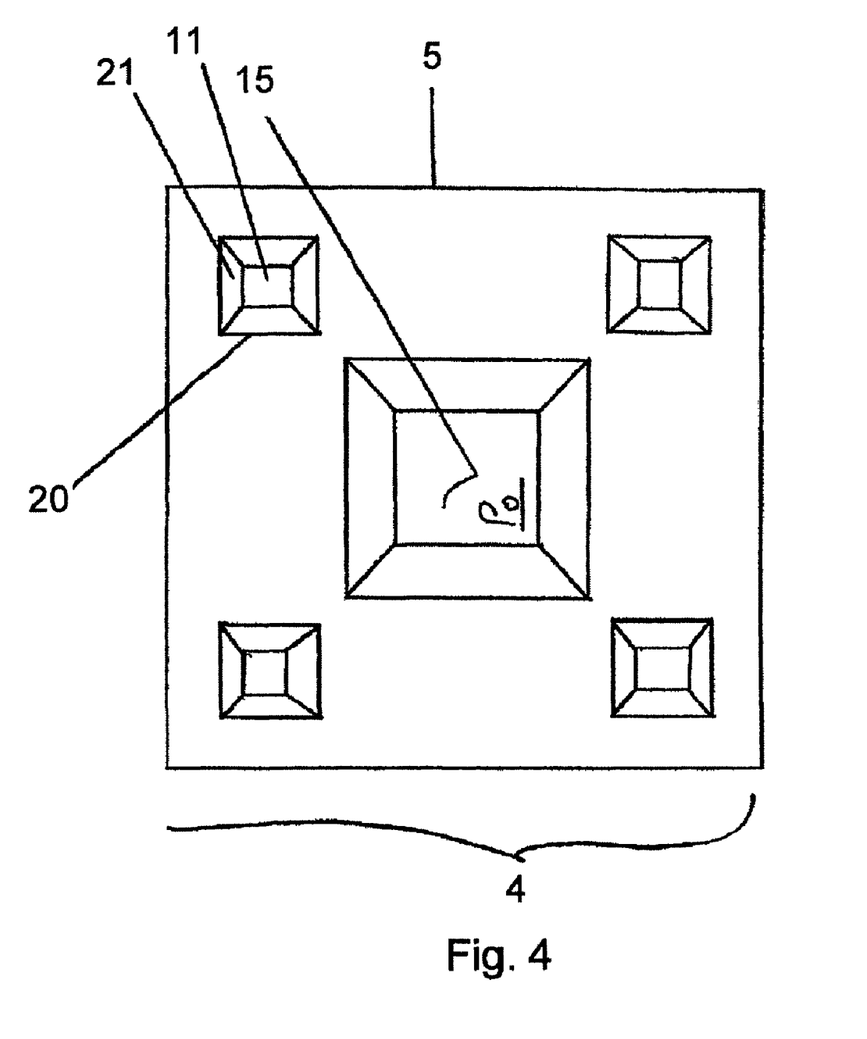
FIG. 4 is a back view in accordance with FIG. 2 of a sensor lower surface with plated-through hole and metallization.

Finally, in FIG. 4 a back view in accordance with FIG. 2 of a sensor lower surface with plated-through hole and metallization is shown. That is, FIG. 4 shows the parallel opposite view of the sensor 4 represented in FIG. 3.

As can be seen from the figure, in the centre of the base body 5 of the sensor 4 the reference surface 15 of the sensor region 6 is shown onto which a reference measurement variable $P_0$ acts for a reference measurement. Through the base body 5 is guided the plated-through hole 11 which for establishing an electrical signal connection is in stable electrical ohmic contact with the measurement electronics 8 not shown in FIG. 4 via the metallization 21 which in the present case is a high temperature metallization 21. For the insulation of the metallization 21 against the silicon base body 5 of the sensor 4 an insulating layer 20 which in the present case is an oxidic insulating layer 20 is provided between metallization 21 and the material of the base body 5 as already described in detail above.

LIST OF REFERENCE NUMERALS 1 sensor unit
2 medium
3 sensor capsule
4 sensor
5 base body
6 sensor region
7 measuring opening
8 measurement electronics
9 measurement surface
10 electrical supply line
11 plated-through hole
12 base side
13 cover layer
14 reference means
15 reference surface
16 sensor support
17 uncoupling means
18 support plate
19 connection means
20 insulating layer
21 metallization
22 BOX
71 hole diaphragm
72 opening
73 mounting means
80 connection bridge
91 side facing the measuring opening
181 glass insulation
$P_0$ reference measurement variable

The invention claimed is:

1. A sensor unit for the measurement of a measurement variable in a medium, in particular in an aggressive liquid or gaseous medium, comprising a sensor arranged in a sensor capsule having a sensor region arranged at a base body wherein for the detection of the measurement variable in the sensor region in the sensor capsule a measuring opening is provided, and the sensor region exhibits on one side facing the measuring opening a measurement surface provided with measurement electronics wherein both the base body and the measurement electronics consist of semiconductor material, wherein for the transmission of a sensor signal generated by the measurement electronics at the sensor at least one electrical supply line is provided, wherein in the base body at least one plated-through hole is provided, through which the measurement electronics is connected via signals through the base body with the electrical supply line on a base side of the sensor facing away from the measuring opening.

2. A sensor unit according to claim 1, wherein the side facing the measuring opening is provided with a cover layer, in particular with a passivation layer made of silicon oxide and/or silicon nitride for the protection against the medium.

3. A sensor unit according to claim 1, wherein a reference means is provided so that a reference surface opposite to the measurement surface may be charged with a reference measurement variable ($P_0$).

4. A sensor unit according to claim 1, wherein a hole diaphragm is provided at the measuring opening.

5. A sensor unit according to claim 1, wherein the sensor is arranged on a sensor support, in particular on a glass wafer or silicon wafer.

6. A sensor unit according to claim 1, wherein for medium separation between measurement surface and reference surface, an anodic bond connects a predeterminable region at the base side of the sensor, in a sealing manner, with the sensor support.

7. A sensor unit according to claim 1, wherein the sensor is a high temperature sensor and/or is made by a SOI technique.

8. A sensor unit according to claim 1, wherein the sensor unit comprises a mounting means for the attachment wherein the mounting means is particularly designed as M5 thread.

9. A sensor unit according to claim 1, wherein the sensor is a pressure sensor and/or a temperature sensor, in particular a piezoresistive sensor and/or a piezoelectric sensor.

10. A combustion engine, hydraulic or pneumatic tool or air conditioning device having a sensor unit according to claim 1.

11. A sensor having a sensor unit according to claim 1, in particular for the measurement of a gas pressure and/or a temperature in an engine inlet of an internal combustion engine and/or in an engine discharge opening and/or in a combustion chamber and/or in an engine housing and/or in an exhaust system, and/or for the measurement of a pressure and/or a temperature in a turbine, in particular in a gas turbine, or for the measurement of a pressure and/or a temperature of an engine oil, a brake fluid, a hydraulic oil, a transmission oil, a fuel, in particular diesel or gasoline, a refrigerant or a cooling fluid, in particular of water.

12. A device having a sensor according to claim 11, said device being one of a combustion engine, a hydraulic tool, a pneumatic tool and an air conditioner.

13. A sensor unit according to claim 1, wherein an uncoupling means is provided between the sensor and the sensor capsule, by means of which the sensor can be uncoupled from thermally and/or mechanically induced changes of the sensor capsule.

14. A sensor unit according to claim 13, wherein the uncoupling means is formed between the base body and the sensor support and/or between the sensor support and a support plate.

15. A sensor unit according to claim 13, wherein the uncoupling means is provided in the region of the electrical supply line.

16. A sensor unit according to claim 13, wherein the uncoupling means is generated by matching the thermal expansion coefficients between the base body and/or the sensor support and/or a connection means and/or the sensor capsule and/or the support plate.

17. A sensor unit according to claim 13, wherein the sensor unit comprises a mounting means for the attachment wherein the mounting means is in the form of the uncoupling means.

* * * * *